US010349751B2

(12) United States Patent
Leng

(10) Patent No.: US 10,349,751 B2
(45) Date of Patent: Jul. 16, 2019

(54) BUNK BED FRAME

(71) Applicant: NEW-TEC INTEGRATION (XIAMEN) CO., LTD., Xiamen, Fujian (CN)

(72) Inventor: Luhao Leng, Fujian (CN)

(73) Assignee: NEW-TEC INTEGRATION (XIAMEN) CO., LTD., Xiamen (CN)

( * ) Notice: Subject to any disclaimer, the term of this patent is extended or adjusted under 35 U.S.C. 154(b) by 291 days.

(21) Appl. No.: 15/316,514

(22) PCT Filed: Jun. 5, 2015

(86) PCT No.: PCT/CN2015/080857
§ 371 (c)(1),
(2) Date: Dec. 5, 2016

(87) PCT Pub. No.: WO2015/185010
PCT Pub. Date: Dec. 10, 2015

(65) Prior Publication Data
US 2017/0188716 A1    Jul. 6, 2017

(30) Foreign Application Priority Data

Jun. 5, 2014   (CN) .................... 2014 2 0296187 U
Jun. 5, 2014   (CN) .................... 2014 2 0296196 U
Jun. 5, 2014   (CN) .................... 2014 2 0296199 U

(51) Int. Cl.
*A47C 19/20*   (2006.01)
*A47C 19/02*   (2006.01)
*F16B 12/56*   (2006.01)

(52) U.S. Cl.
CPC ............ *A47C 19/202* (2013.01); *A47C 19/02* (2013.01); *A47C 19/20* (2013.01); *F16B 12/56* (2013.01)

(58) Field of Classification Search
CPC .......... A47C 19/00; A47C 19/02; A47C 19/20; A47C 19/202; A47C 19/021;
(Continued)

(56) References Cited

U.S. PATENT DOCUMENTS

| 895,898 A * | 8/1908 | Scheer .................. A47C 19/20 5/9.1 |
| 2,647,267 A * | 8/1953 | McLaughlin .......... A47C 19/20 5/285 |

(Continued)

FOREIGN PATENT DOCUMENTS

| CN | 202354942 U | 8/2012 |
| CN | 203168565 U | 9/2013 |

(Continued)

*Primary Examiner* — Robert G Santos
*Assistant Examiner* — David R Hare
(74) *Attorney, Agent, or Firm* — Rabin & Berdo, P.C.

(57) ABSTRACT

The present invention is provided with a bunk bed frame, comprising two top bedsteads, two bottom bedsteads and connecting pipes. The two top bedsteads are connected by top cross beams, two bottom bedsteads are connected by bottom cross beams, wherein two sides of the top bedstead are respectively disposed with an insert element, which extends downwardly. Two sides of the bottom bedstead are respectively disposed with a support leg. The lower portion of the connecting pipe is detachably connected to the support leg, a first connecting point of the connecting pipe and the support leg of the lower bedstead and a second connecting point of the support leg and the cross beam of the bottom bedstead coincide. The insert element is inserted into the connecting pipe, and detachably connected to the connecting pipe. A third connecting point of the insert element and the connecting pipe and a fourth connecting point of the insert element and the cross beam of the top bedstead coincide. The detachable connecting point of the top and bottom bedstead coincides with the connecting point of the (Continued)

top and bottom bedstead and the cross beam, so that the assembly can be finished without additional workload and screws, the assembling time can be reduced.

7 Claims, 11 Drawing Sheets

(58) Field of Classification Search
CPC ... A47C 19/022; A47C 19/024; A47C 19/025; A47C 19/045; F16B 12/56
See application file for complete search history.

(56) References Cited

U.S. PATENT DOCUMENTS

| | | | | |
|---|---|---|---|---|
| 3,037,213 | A * | 6/1962 | Anderegg | A47C 19/20 5/8 |
| 3,886,604 | A * | 6/1975 | Ewing | A47C 19/005 5/8 |
| 4,179,763 | A * | 12/1979 | Echavarren | A47C 19/205 5/8 |
| 4,896,385 | A * | 1/1990 | Bustos | A47C 19/20 5/9.1 |
| 5,233,707 | A * | 8/1993 | Perkins | A47C 19/205 182/178.5 |
| 5,596,776 | A * | 1/1997 | Huang | A47C 21/08 5/426 |
| 6,314,595 | B1 * | 11/2001 | Price | A47C 19/005 5/11 |
| 6,675,409 | B1 * | 1/2004 | O'Dell, Jr. | A47C 17/84 5/11 |
| 6,925,665 | B1 * | 8/2005 | Hennings | A47C 19/021 5/200.1 |
| 7,051,384 | B1 * | 5/2006 | Guillot | A47C 17/50 5/425 |
| 7,096,523 | B2 * | 8/2006 | Hennings | A47C 19/04 5/11 |
| 7,188,380 | B1 * | 3/2007 | Wang | A47C 11/00 5/279.1 |
| 7,203,980 | B2 * | 4/2007 | McBrayer, Jr. | A47C 21/08 5/282.1 |
| 7,793,367 | B1 * | 9/2010 | Ruiter | A47C 19/202 5/2.1 |
| 8,136,180 | B2 * | 3/2012 | Leng | A47C 21/08 5/282.1 |
| 8,839,469 | B1 * | 9/2014 | Anderson | A47C 19/20 5/288 |
| 9,044,100 | B1 * | 6/2015 | Wang | A47C 19/20 |
| 9,907,409 | B2 * | 3/2018 | Leng | A47C 19/20 |
| 2005/0050633 | A1 * | 3/2005 | Rogers | A47C 19/20 5/9.1 |
| 2011/0219537 | A1 * | 9/2011 | Lin | A47C 19/021 5/9.1 |
| 2017/0354264 | A1 * | 12/2017 | Winer | A47C 19/022 |

FOREIGN PATENT DOCUMENTS

| | | |
|---|---|---|
| CN | 203914154 U | 11/2014 |
| CN | 203914155 U | 11/2014 |
| CN | 203914168 U | 11/2014 |
| JP | 2004044298 A | 2/2004 |

\* cited by examiner

BUNK BED FRAME

CROSS-REFERENCE TO RELATED APPLICATION

This application claims the priorities of Chinese Patent Application No. 201420296199.2, entitled "A Highbed Frame" Chinese Patent Application No. 201420296196.9, entitled "A Highbed With Improved Structure" and Chinese Patent Application No. 201420296187.X, entitled "A Highbed With Improved Guardrail Structure," all filed on Jun. 5, 2014, the contents of which are incorporated herein by reference in its entirety.

TECHNICAL FIELD

The present invention relates to a bunk bed, particularly to a detachable bunk bed frame.

BACKGROUND

A bunk bed can efficiently use more space than a single bed. A bunk bed is usually detachable, comprising bed boards, a ladder and two side bedsteads. The side bedstead of the bunk bed is usually an integrate piece. The top and bottom bed share least a support bar or pipe, leading to a large occupied space, and transportation inconvenience. There is an existing bunk bed with the support bar or pipe of the side bedstead being divided into two sections, the support bar or pipe is detachably connected at the centre, so that the bunk bed can be divided into two single beds to be used independently. The side bedsteads can be connected to form a bunk bed. When two side bedsteads is divided into two parts, the connecting structures are increased, the strength of the support bar or pipe of the bunk bed is affected. In general, the consumers do not use the bunk bed separately as two single beds. Therefore, this kind of bunk bed increases the assemble effort of the support bars or pipes, and the divided structure is not a good design.

SUMMARY

The present invention provides a bunk bed frame, which overcomes the disadvantages of the existing technology. The present invention applies the connecting point of existing bunk bed to be the connecting point of the detachable support bars or pipes of the bunk bed, so that it can be assembled without additional workload. A technical solution of the present invention provides:

A bunk bed frame, comprising: two top bedsteads; two bottom bedsteads; and connecting pipes, the two top bedsteads connected by top cross beams, the two bottom bedsteads connected by bottom cross beams, wherein two sides of the top bedstead are respectively disposed with an insert element, the insert element extending downwardly, two sides of the bottom bedstead are respectively disposed with a support leg, a lower portion of the connecting pipe is detachably connected to the support leg, a first connecting point of the connecting pipe and the support leg of the lower bedstead and a second connecting point of the support leg and the cross beam of the bottom bedstead coincide, the insert element is inserted into the connecting pipe, the insert element is detachably connected to the connecting pipe, and a third connecting point of the insert element and the connecting pipe and a fourth connecting point of the insert element and the cross beam of the top bedstead coincide.

The diameter of the leg pipe is larger than that of the connecting pipe, the diameter of the connecting pipe is larger than that of the insert pipe.

In another preferred embodiment, the insert element, the joining pipe and the connecting pipe are detachably connected by rivets and screws.

In another preferred embodiment, the insert element, the connecting pipe and the support leg are circular tubes, the top portion of the support leg is disposed with a connecting portion, the connecting portion is inserted to the connecting pipe.

In another preferred embodiment, the insert element, the connecting pipe are circular tubes and the support leg is a square tube, further comprising a second join pipe, the second join pipe is inserted to the leg tube through the top of the support leg, the top of the second join pipe is disposed with an assembly hole, the connecting pipe is inserted to the assembly hole.

In another preferred embodiment, the support leg, the second joint pipe and the connecting pipe are detachably connected by rivets and screws.

Another solution of the present invention provides: A bunk bed frame, comprising a top bedstead; a bottom bedstead; and connecting pipes, two sides of the top bedstead disposed with an insert element extending downwardly, the insert element of the top bedstead connected with a top bedstead cross beam, wherein the connecting pipe comprises a connecting section and a support leg section, two sides of the bottom bedstead are respectively the support leg section of the connecting pipe, the support leg section of the connecting pipe supports the bottom bedstead cross beam, the insert element is inserted into a joining pipe, the insert element is detachably connected to the joining pipe, and a third connecting point of the insert element and the connecting pipe and a fourth connecting point of the insert element of the top bedstead and the top bedstead cross beam coincide.

Another technical solution of the present invention provides:

A bunk bed frame, comprising two top bedsteads; two bottom bedsteads; and connecting pipes, the two top bedsteads connected by a top bedstead cross beam, the two bottom bedsteads connected by a bottom bedstead cross beam, the connecting pipe comprising an insert section and a connecting section, the insert section of the connecting pipe being a support element of the top bedstead, the top bedstead cross beam connected to the insert section of the connecting pipe, wherein the side of the bottom bedstead is a support leg, the connecting section of the connecting pipe is detachably connected to the support leg, and a first connecting point of the connecting pipe and the support leg of the bottom bedstead and a second connecting point of the support leg and the bottom bedstead cross beam coincide.

Compared to the conventional technology, the technical solutions of the present invention have following advantages:

1. The detachable connecting point of the top and bottom bedstead coincides with the connecting point of the top and bottom bedstead and the cross beam, so that the assembly can be finished without additional workload and screws, the assembling time may be reduced.

2. The side of the top bedstead is disposed with an insert pipe, the side of the bottom bedstead is disposed with a leg pipe, the bottom surface of the connecting pipe is detachably connected to the leg pipe. The insert pipe, the joining pipe and the connecting pipe are detachably connected. The top bedsteads, the connecting pipes and the bottom bedsteads can be individually packed and transported, the transport capacity is greatly increased, and the transportation cost is efficiently reduced.

3. The diameter of the leg pipe is larger than that of the connecting pipe, the diameter of the connecting pipe is larger than that of the insert pipe. The insert pipe, the connecting pipe and the leg pipe provide a three-dimensional stepped perception, satisfying the needs of specific consumers.

4. The insert pipe, the joining pipe and the connecting pipe are detachably connected by rivets and screws, the rivets are fixed in the insert pipe, providing a clean appearance.

BRIEF DESCRIPTION OF THE DRAWINGS

The present invention will be further described with the drawings and the embodiments.

DETAILED DESCRIPTION OF EMBODIMENTS

Embodiment 1

Figure 1:
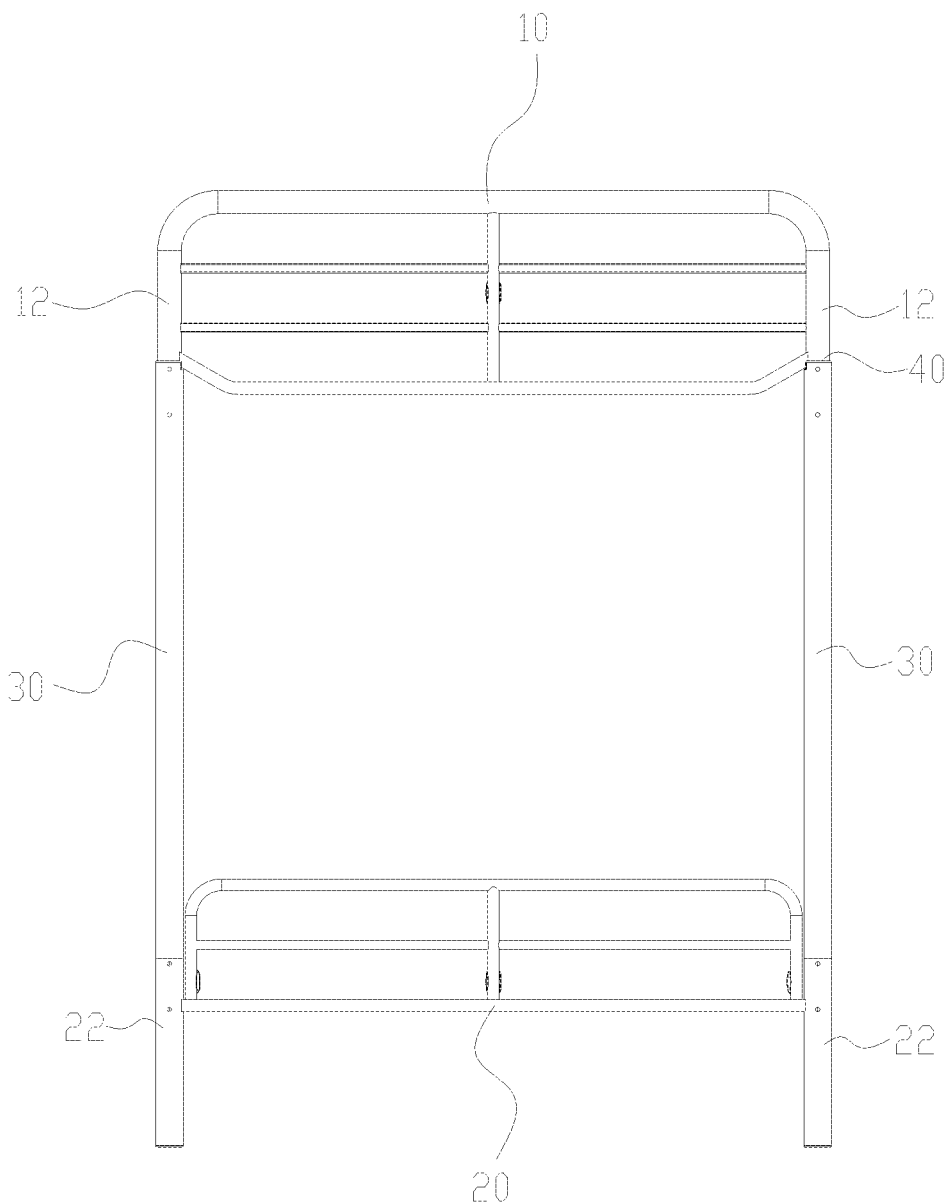
FIG. 1 illustrates a front view of a bunk bed frame of a first embodiment of the present invention.
Figure 2:
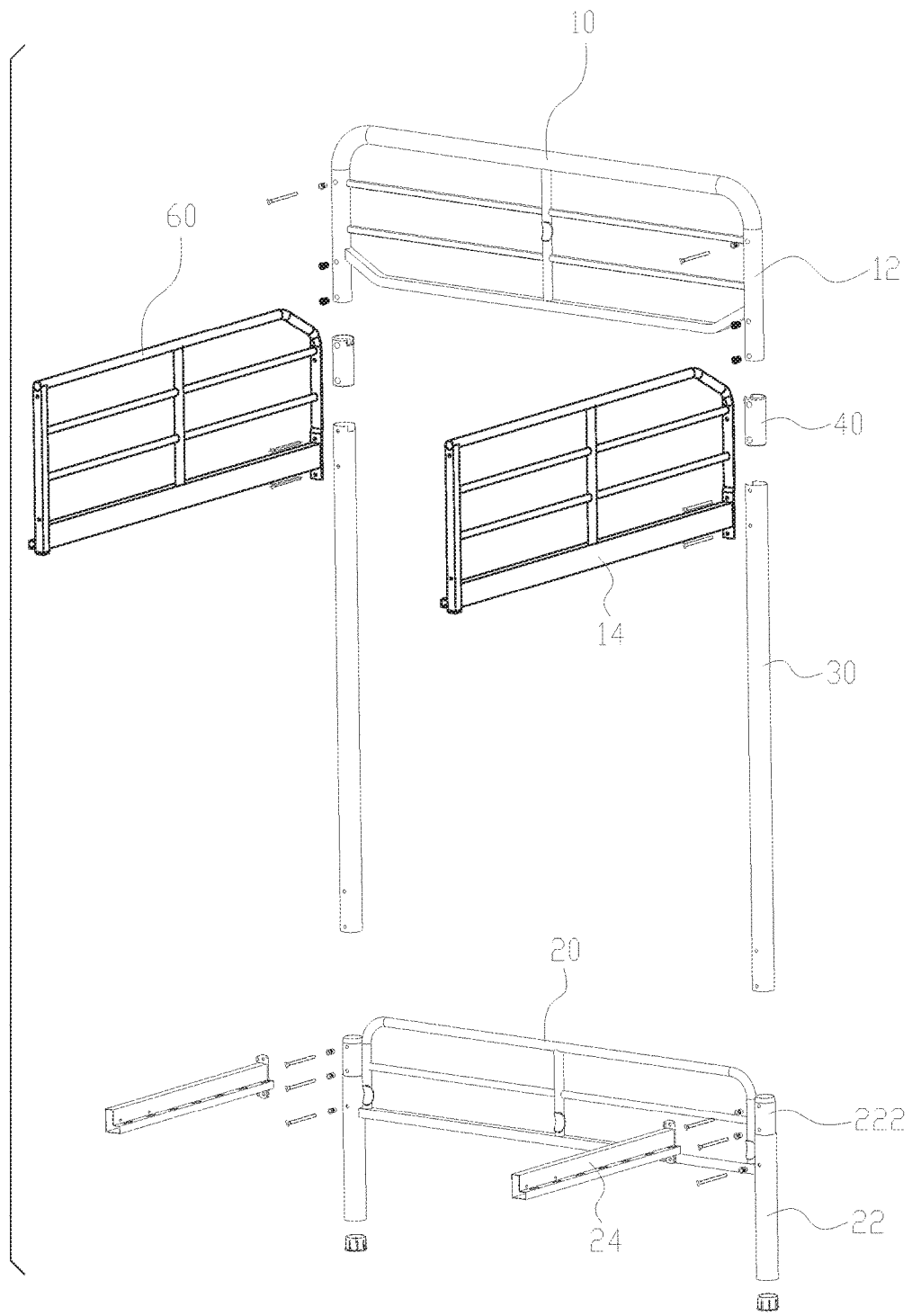
FIG. 2 illustrates an exploded and schematic diagram of a bedstead of FIG. 1.

Referring to FIGS. 1-5, a bunk bed frame of the present invention comprises a top bedstead 10, a bottom bedstead 20, connecting pipes 30 and joining pipes 40.

Two sides of the top bedstead 10 are respectively disposed with an insert element 12, which extends downwardly and inserts to the connecting pipe 30. A top bedstead cross beam 14 is connected to the insert element 12 of the top bedstead 10. Two sides of the bottom bedstead 20 are respectively disposed with a support leg 22. The top portion of the support leg 22 is disposed with a connecting portion 222, the connecting portion 222 is further disposed with a protrusion for the connecting pipe to be positioned. The support leg 22 of the bottom bedstead 20 is connected to a bottom bedstead cross beam 24. The insert element 12, the connecting pipe 30, the support leg 22 can be circular tubes, square tubes or other shaped tubes. The support leg and the insert pipe may also be non-tubular, i.e. solid bars.

The connecting portion 222 of the support leg is positioned and inserted into the connecting pipe 30, the bottom portion of the connecting pipe 30 is detachably connected to the support leg 22 by screw. A first connecting point of the connecting pipe 30 and the support leg 22 coincides with a connecting point of the support leg 22 and the bottom bedstead cross beam 24.

The joining pipe 40 is inserted into the connecting pipe 30 from the top of the connecting pipe 30. The insert element 12 is inserted into the joining pipe 40. The insert element 12, the joining pipe 40 and the connecting pipe 30 are detachably connected. The second connecting point of the insert element 12, the joining pipe 40, the connecting pipe 30 coincides the connecting point of the top bedstead 10 and the top bedstead cross beam 14.

Preferably, the connecting pipe 30 is detachably connected to the support leg 22 by rivets and screws. The insert element 12, the joining pipe 40 and the connecting pipe 30 are detachably connected by rivets and screws. The diameter of the support leg 22 is larger than that of the connecting pipe 30. The diameter of the connecting pipe 30 is larger than that of the insert element 12.

Figure 3:
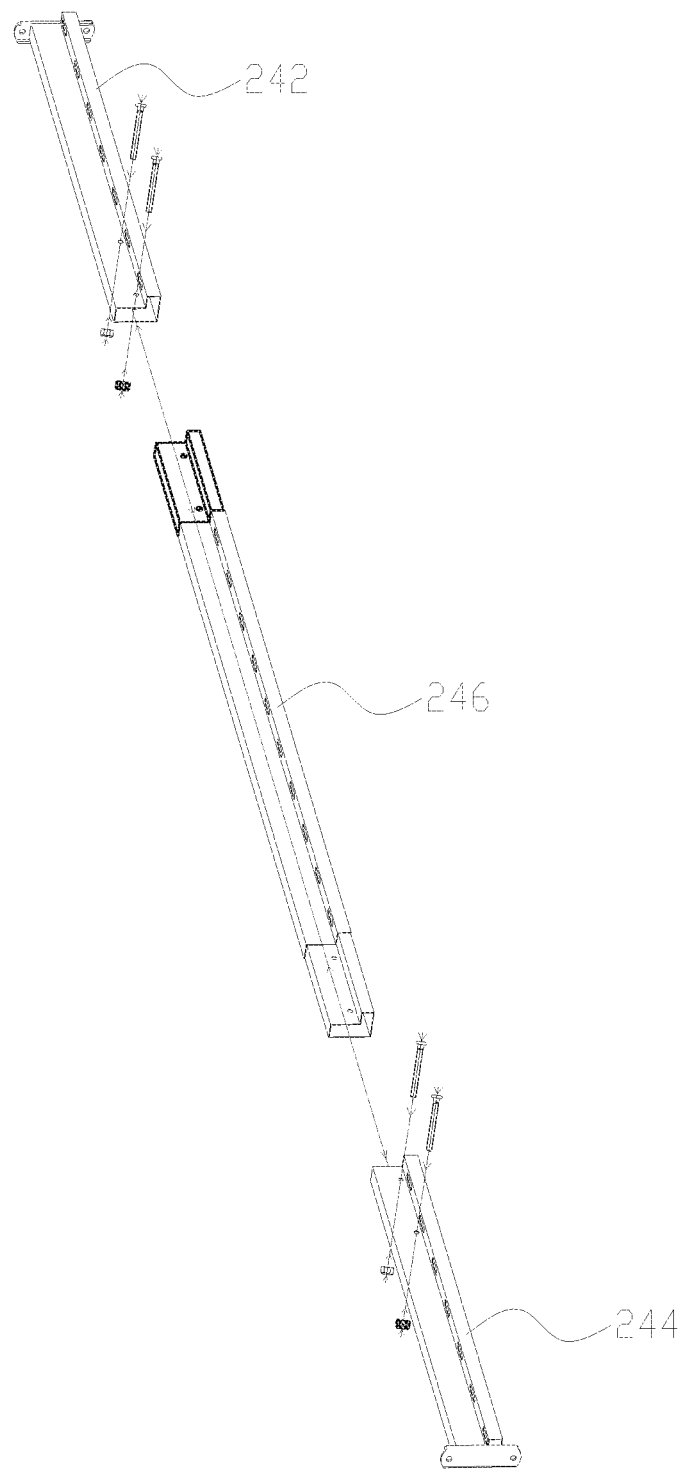
FIG. 3 illustrates an exploded and schematic diagram of a cross beam of the bunk bed of the present invention.
Figure 4:
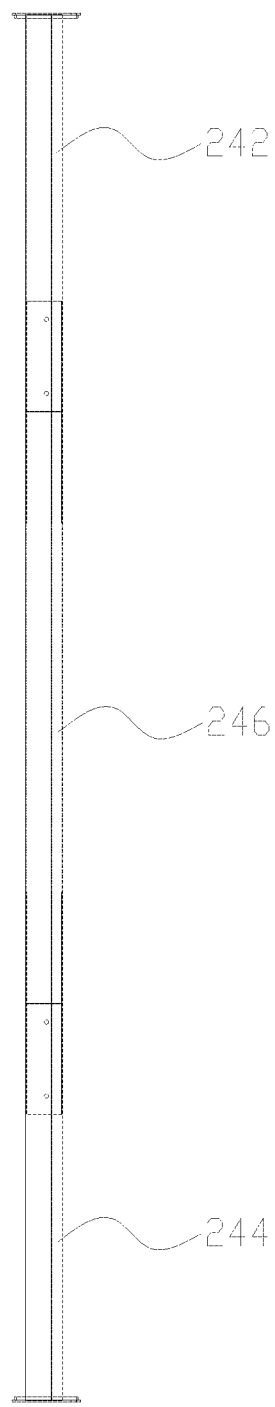
FIG. 4 illustrates a front view of the cross beam of FIG. 3.

As shown in FIG. 3 and FIG. 4, the cross beam 24 is divided into sections. The cross beam comprises a first cross beam section 242, a second cross beam section 244 and a central cross beam 246. A first end of the central cross beam 246 is inserted into the first cross beam section 242. The central cross beam 246 is detachably connected to the first cross beam section 242. A second end of the central cross beam 246 is inserted into the second cross beam section 244, the central cross beam 246 is detachably connected to the second cross beam section 244.

Figure 5:
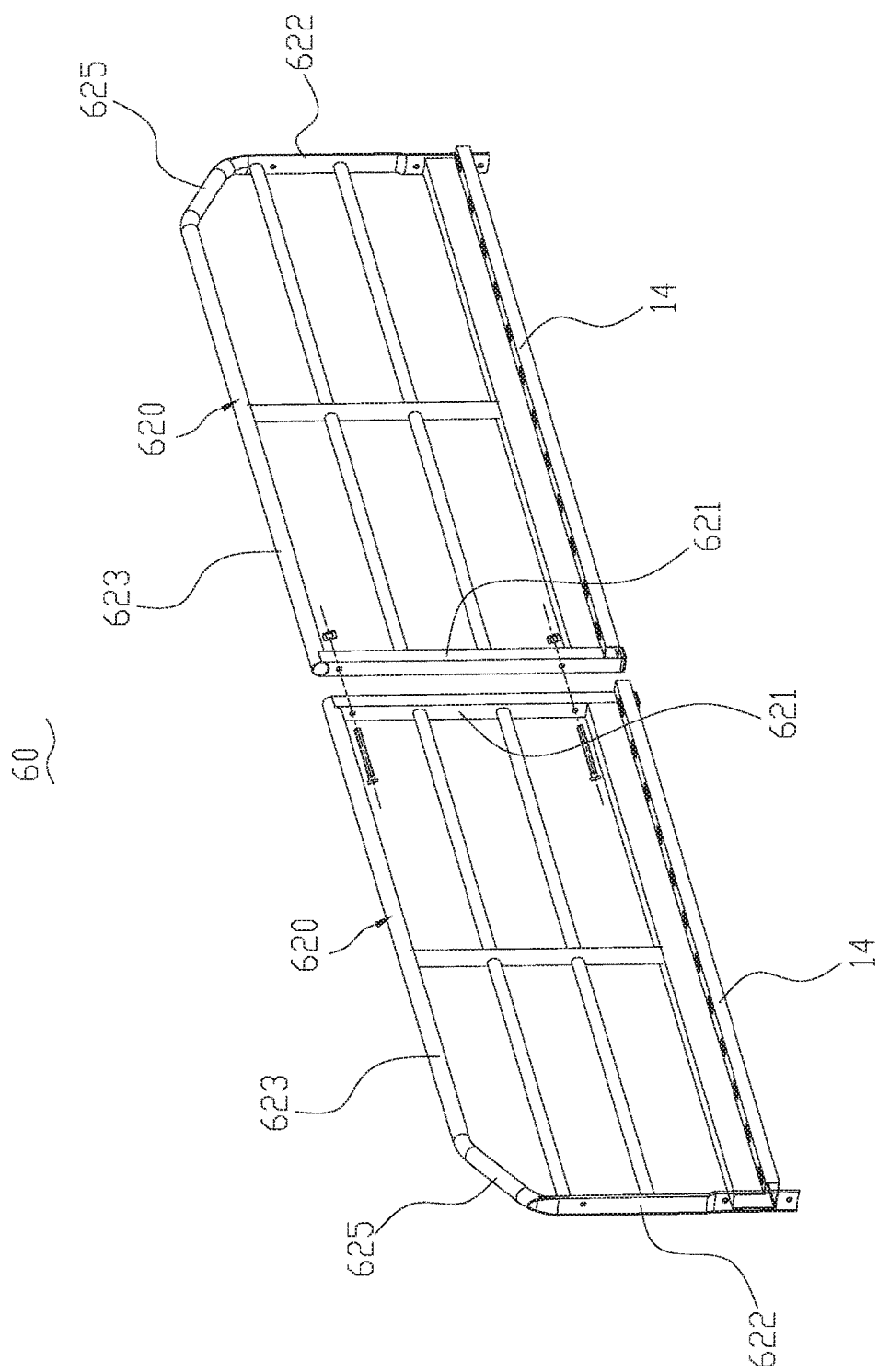
FIG. 5 illustrates a schematic diagram of a guard bar of the bunk bed of the present invention.

As illustrated in FIG. 5, a bed board frame 60 is disposed between two side bedsteads. The side of the bed board frame 60 is disposed with a guard bar 62. The guard bar 62 comprises two or three guard bar units 620, the guard bar units may be connected by screws or bolts to form a guard bar. Or the guard bar units are pivoted become a guard bar.

The guard bar unit is a bar frame, the bar frame comprises an inner stand pipe 621, an outer stand pipe 622, a top cross pipe 623, a bottom cross pipe 624 and an incline pipe 625, the incline pipe 625 connects the outer stand pipe 622 and the top cross pipe 623. The intersection angle of the incline pipe 625 and the top cross pipe 623 is 20°-60°.

Embodiment 2

Figure 6:
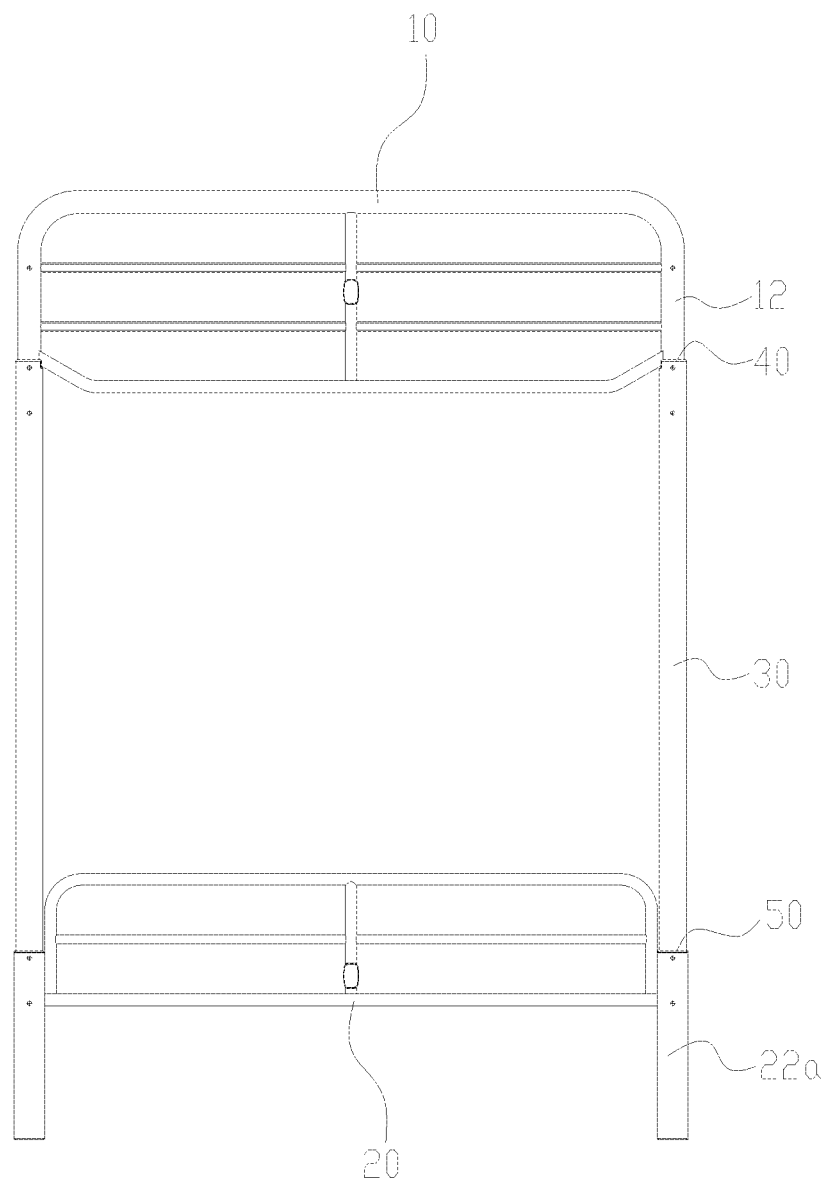
FIG. 6 illustrates a front view of a bunk bed frame of a second embodiment of the present invention.
Figure 7:
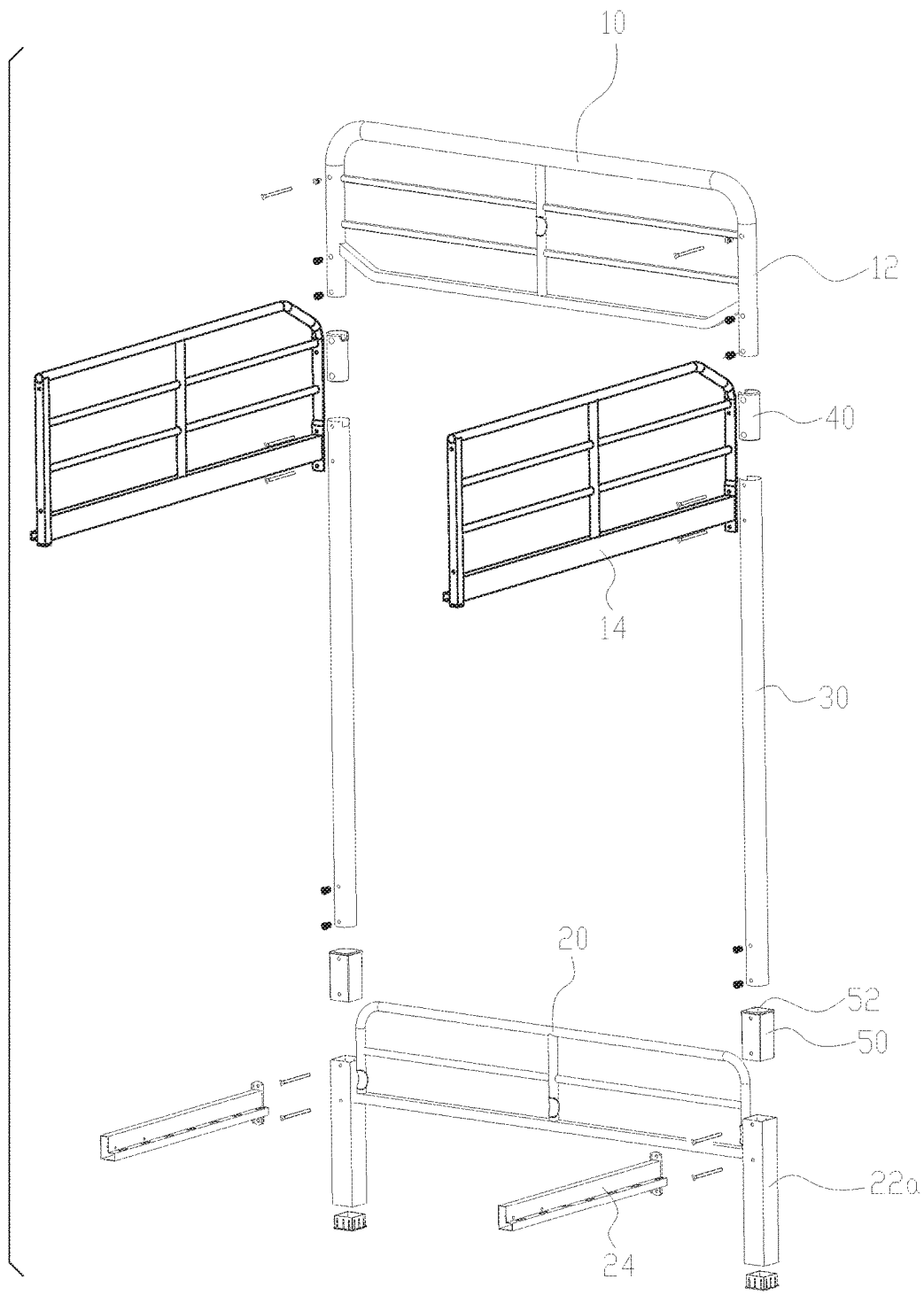
FIG. 7 illustrates an exploded and schematic diagram of a bedstead of FIG. 7.

Referring to FIG. 6 and FIG. 7, this embodiment differs from Embodiment 1 in that: it further comprises a second joining pipe 50, the top of which is disposed with an assembly hole 52. The support leg is a square tube 22a. The second joining pipe 50 is inserted into or sleeved on the square pipe 22a from the top surface of the square tube 22a. The connecting pipe 30 is inserted into the assembly hole 52. The square tube 22a, the second joining pipe 50 and the connecting pipe are detachably connected by rivets and screws.

A first connecting point of the connecting pipe 30, the second joining pipe 50 and the support leg 22 coincides with the connecting point of the support leg 22 and the bottom bedstead cross beam 24.

Embodiment 3

Figure 8:
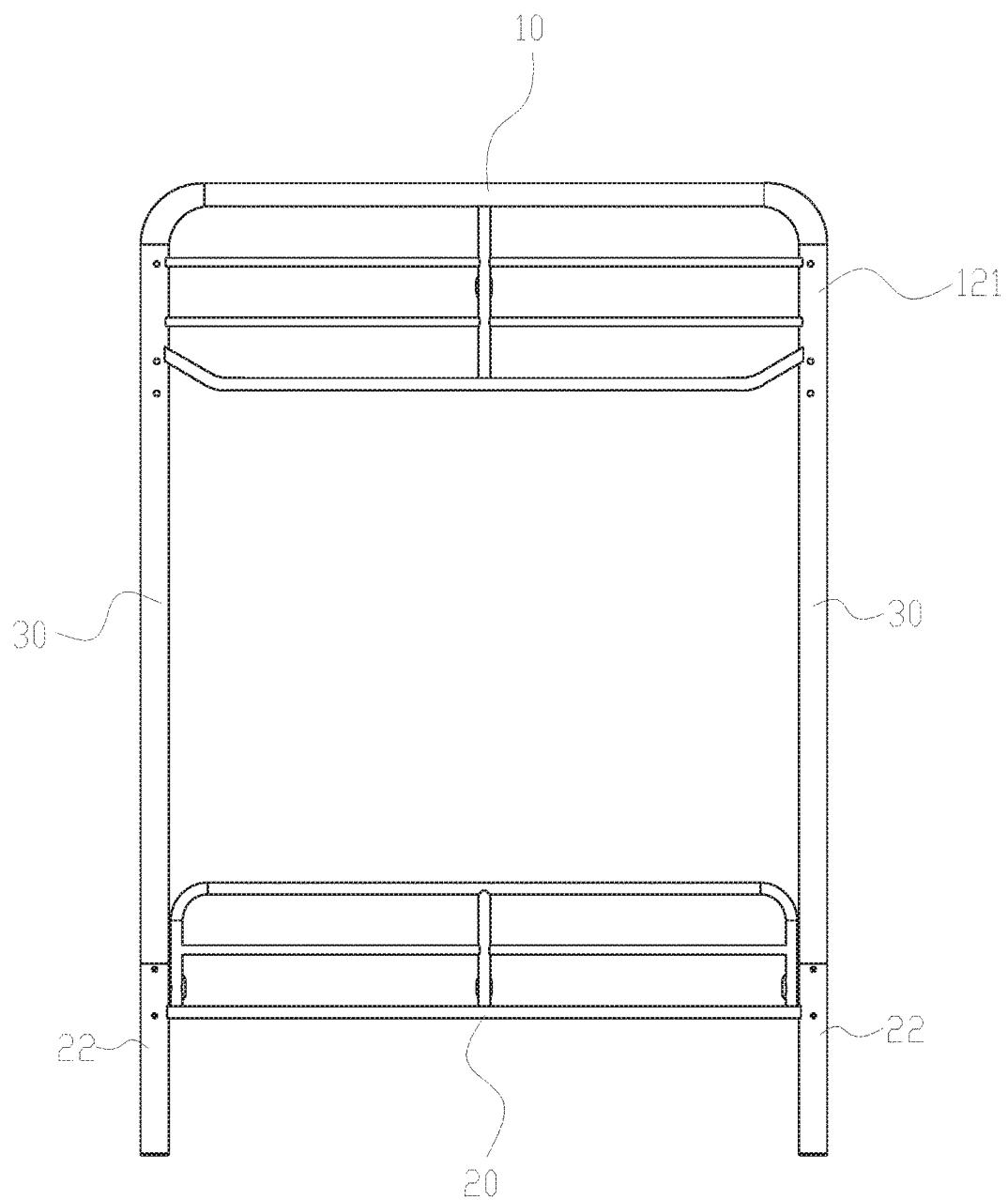
FIG. 8 illustrates a front view of a bunk bed frame of a third embodiment of the present invention.
Figure 9:
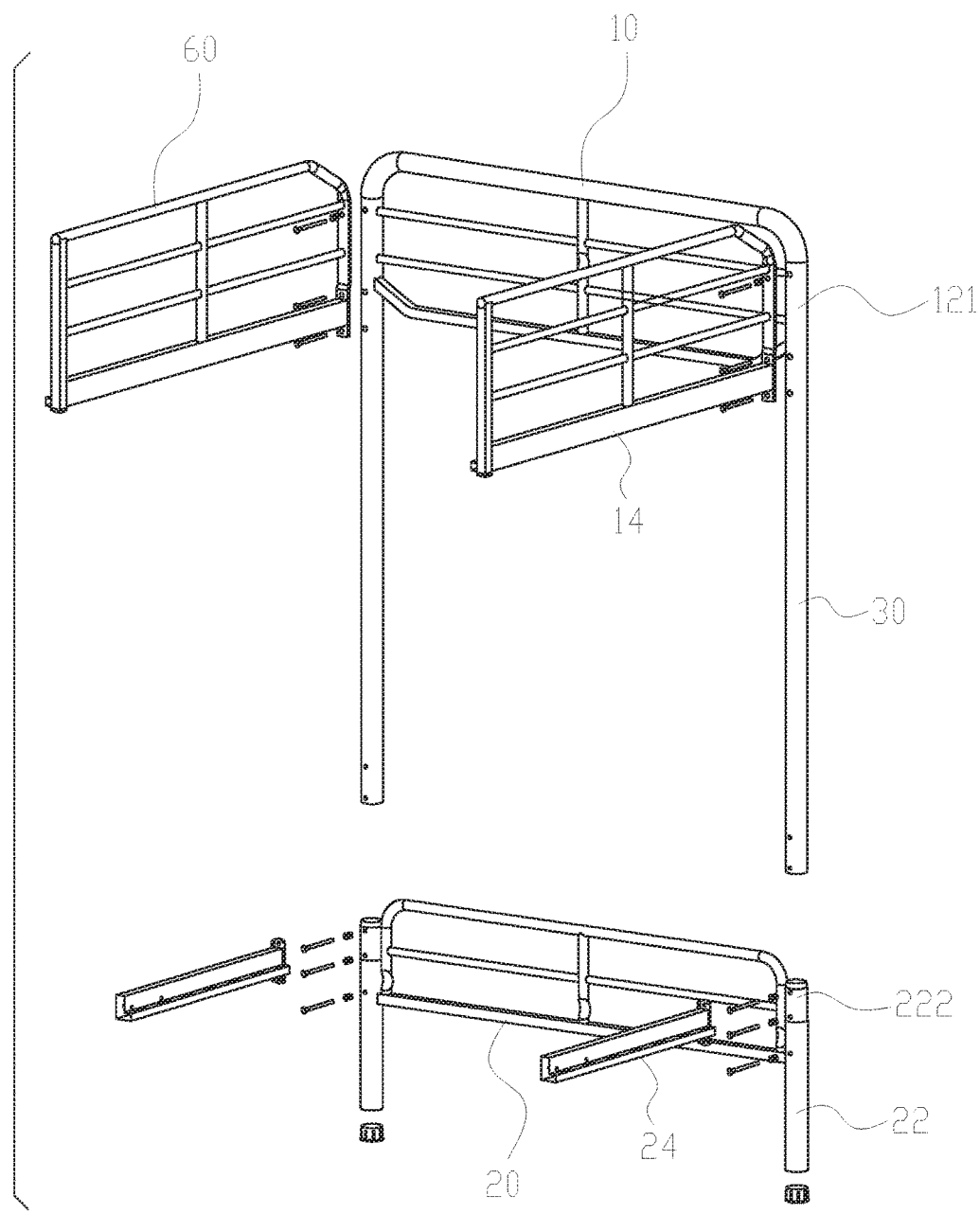
FIG. 9 illustrates an exploded and schematic diagram of a bedstead of FIG. 8.

Referring to FIG. 8 and FIG. 9, the bunk bed frame comprises a top bedstead 10, a bottom bedstead 20, connecting pipes 30 and joining pipes 40.

Two sides of the top bedstead 10 are respectively disposed with an insert element 12, which extends downwardly to insert to the connecting pipe 30. A top bedstead cross beam 14 is connected to the insert element 12 of the top bedstead 10.

This embodiment has the feature that the connecting pipe 30 comprises a connecting section and a support leg section 221. Two sides of the bottom bedstead 20 are respectively the support leg section 221. The support leg section 221 of the connecting pipe 30 is connected to the bottom bedstead cross beam 24.

The joining pipe 40 is inserted into the connecting pipe 30 from the top of the connecting pipe 30. The insert element 12 is inserted into the joining pipe 40. The insert element 12, the joining pipe 40, the connecting pipe 30 are detachably connected. A second connecting point of the insert element 12, the joining pipe 40 and the connecting pipe coincides with the connecting point of the insert element 12 of the top bedstead 10 and the top bedstead cross beam 14.

Embodiment 4

Figure 10:
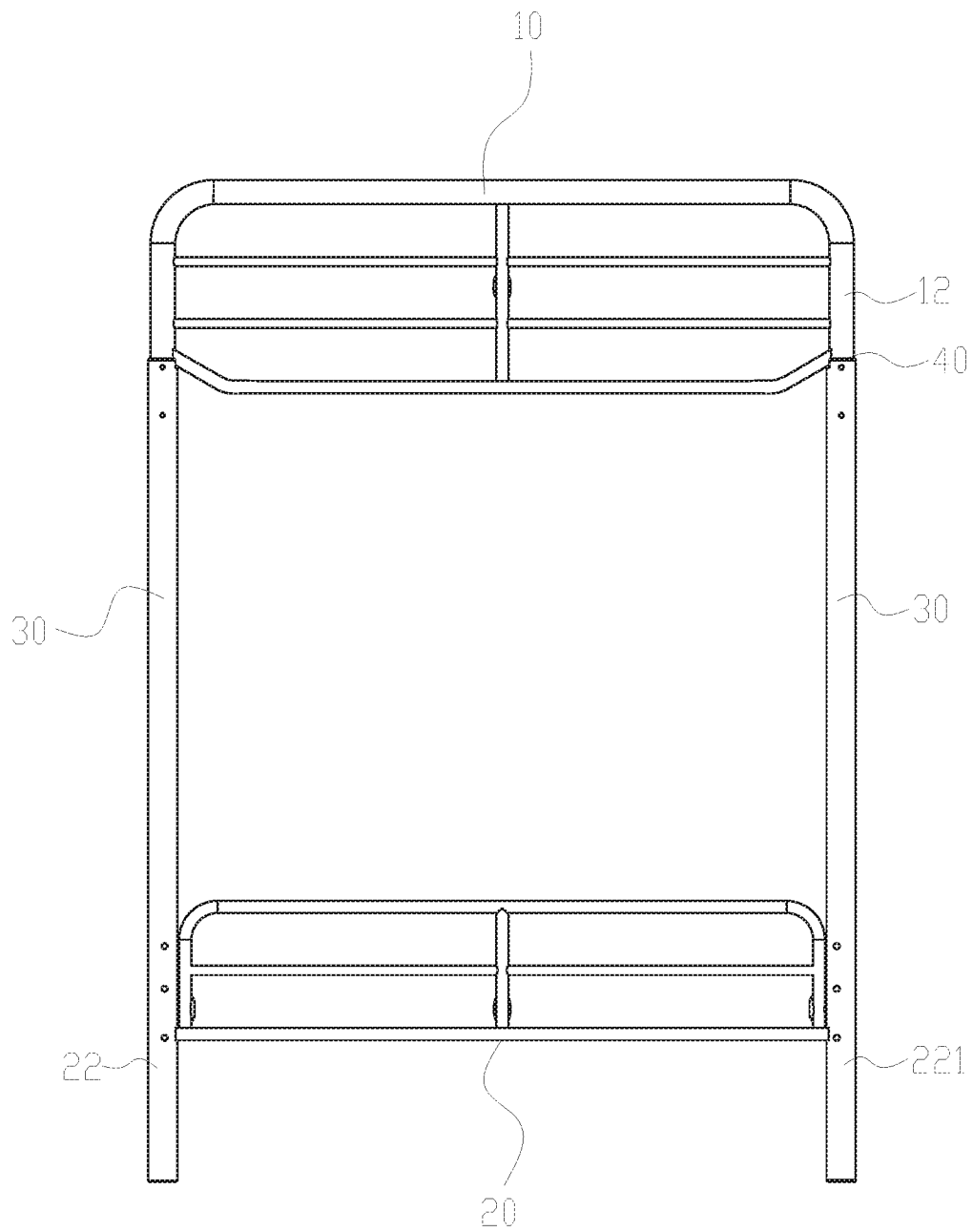
FIG. 10 illustrates a front view of a bunk bed frame of a fourth embodiment of the present invention.
Figure 11:
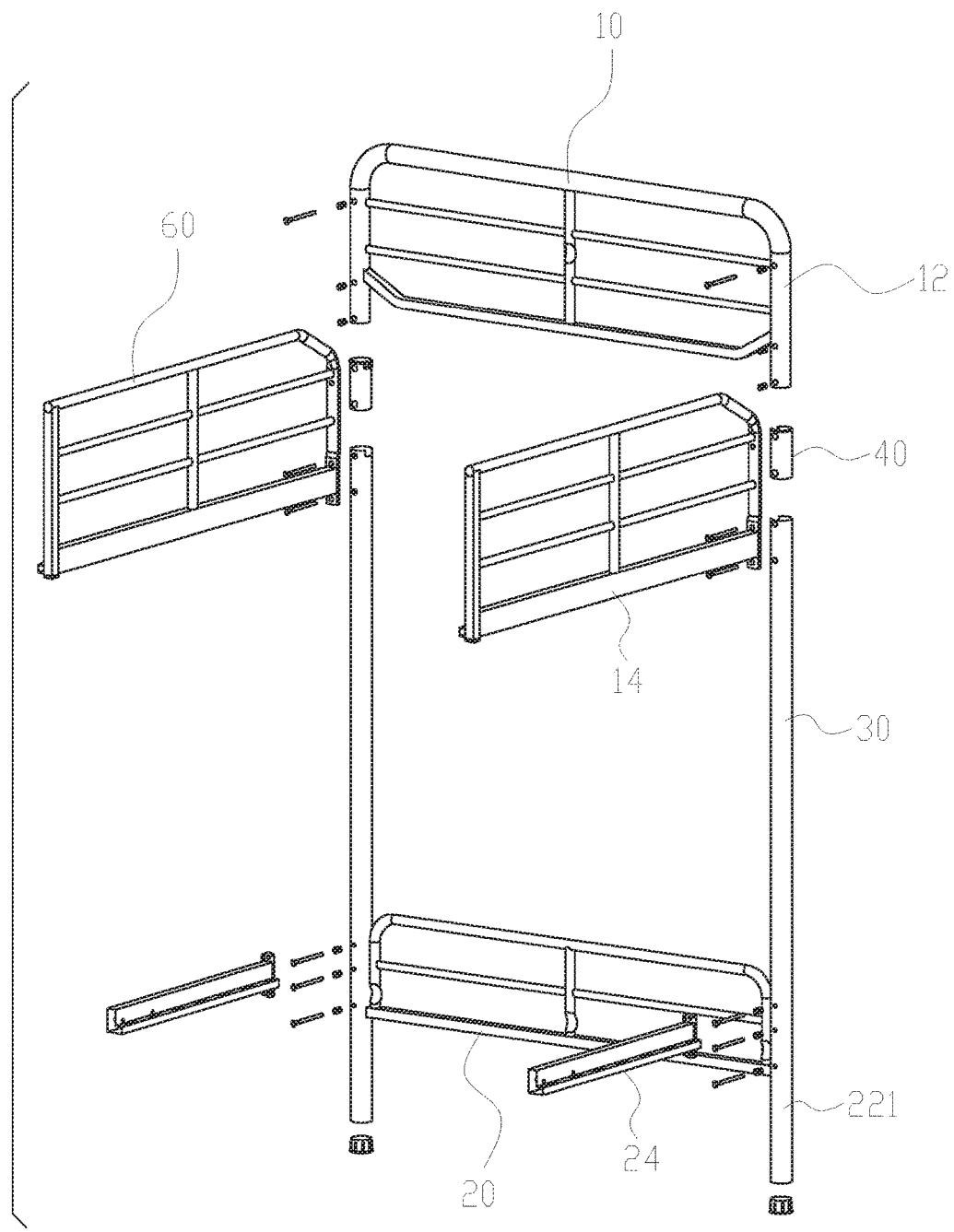
FIG. 11 illustrates an exploded and schematic diagram of a bedstead of FIG. 10.

Referring to FIG. 10 and FIG. 11, similar to Embodiment 3, the connecting pipe 30 comprises an insert section 121 and a connecting section extends upwardly, a first connecting point of the support leg 22 and the connecting pipe 30 coincides with the connecting point of the support leg 22 and the bottom bedstead cross beam 24.

The insert section 121 of the connecting pipe 30 is a side support of the top bedstead, the top bedstead cross beam 14 is connected to the insert section 121 of the connecting pipe.

The above description is the preferred embodiments of the present invention, and is not intended to limit the scope of the present invention. Any technical solutions teaching a connecting point of the support leg and the connecting pipe coinciding with the connecting point of the support leg and the bedstead cross beam, having a variety of equivalent modifications and changes based on the patentable scope and description content of the present invention, are within the scope of the present invention.

INDUSTRIAL APPLICABILITY

The present invention is provided with a bunk bed that can reduce the assembling time of the bed frame. The top bedsteads, the connecting pipes and the bottom bedsteads can be individually packed and transported, the transport capacity is greatly increased, and the transportation cost is efficiently reduced. Therefore the present invention has well industrial applicability.

What is claimed is:

1. A bunk bed frame, comprising:
   a top bedstead;
   a bottom bedstead; and
   two connecting pipes, wherein
   each of two sides of the top bedstead is disposed with an insert element extending downwardly,
   the insert elements of the top bedstead are connected with a top bedstead cross beam,
   each of the connecting pipes includes a connecting section and a support leg section,
   on two sides of the bottom bedstead are respectively the support leg sections of the connecting pipes,
   the support leg sections of the connecting pipes support a bottom bedstead cross beam, and
   each of the insert elements is inserted into a joining pipe, and is detachably connected to the joining pipe, a connecting point of said each insert element and one of the connecting pipes coinciding with a connecting point of said each insert element and the top bedstead cross beam.

2. The bunk bed frame according to claim 1, wherein said each insert element is connected to the one connecting pipe by the joining pipe.

3. The bunk bed frame according to claim 1, wherein said each insert element, the joining pipe and the one connecting pipe are detachably connected by rivets and screws.

4. A bunk bed frame, comprising:
   two top bedsteads;
   two bottom bedsteads; and
   two connecting pipes, wherein
   the two top bedsteads are connected by a top bedstead cross beam,
   the two bottom bedsteads are connected by a bottom bedstead cross beam,
   each of the connecting pipes includes an insert section and a connecting section, the insert section being a support element of one of the top bedsteads, and being connected to the top bedstead cross beam, and
   on each of two sides of the bottom bedsteads is a support leg, which is detachably connected to the connecting section of one of the connecting pipes, a connecting point of said one connecting pipe and the support leg coinciding with a connecting point of the support leg and the bottom bedstead cross beam.

5. The bunk bed frame according to claim 4, wherein an upper portion of the support leg is a connecting portion, the connecting portion being fastened and inserted into the connecting pipe.

6. The bunk bed frame according to claim 4, wherein
   the support leg is a square tube,
   the bunk bed frame further includes a second joining pipe, which is inserted into a top portion of the support leg,
   the second joining pipe has an assembly hole formed at a top portion thereof, said one connecting pipe being inserted into the assembly hole.

7. The bunk bed frame according to claim 6, wherein the support leg, the second joining pipe and said one connecting pipe are detachably connected by rivets and screws.

* * * * *